(12) United States Patent
Roth (10) Patent No.: US 6,208,343 B1
(45) Date of Patent: Mar. 27, 2001

(54) GRAPHICAL USER INTERFACE SCROLL BAR THAT PROVIDES VARIED LEVELS OF ACCESS GRANULARITY

(75) Inventor: Steven William Roth, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/988,021

(22) Filed: Dec. 10, 1997

(51) Int. Cl.[7] .................................................. G06F 3/00
(52) U.S. Cl. ........................ 345/341; 345/123; 345/339; 345/163
(58) Field of Search ................................ 345/341, 973, 345/974, 123, 340, 339, 163

(56) References Cited

U.S. PATENT DOCUMENTS

| | | | |
|---|---|---|---|
| 5,196,838 | 3/1993 | Meier et al. | 340/724 |
| 5,313,229 | 5/1994 | Gilligan et al. | 345/157 |
| 5,371,846 | 12/1994 | Bates | 395/157 |
| 5,374,942 | 12/1994 | Gilligan et al. | 345/157 |
| 5,473,344 | 12/1995 | Bacon et al. | 345/163 |
| 5,495,566 | * 2/1996 | Kwatinetz | 395/157 |
| 5,506,951 | * 4/1996 | Ishikawa | 395/157 |
| 5,526,480 | 6/1996 | Gibson | 395/154 |
| 5,528,259 | * 6/1996 | Bates et al. | 345/121 |
| 5,530,455 | 6/1996 | Gillick et al. | 345/163 |
| 5,532,715 | * 7/1996 | Bates et al. | 345/123 |
| 5,633,657 | 5/1997 | Falcon | 345/145 |
| 5,751,285 | * 5/1998 | Kashiwagi et al. | 345/349 |
| 5,872,566 | * 2/1999 | Bates et al. | 345/341 |

OTHER PUBLICATIONS

Delrina 7.0 WinFax Pro Getting Started Guide, Getting Started Basics, Apr. 1996, pp. 5–11.

IBM Technical Disclosure Bulletin, vol. 37, No. 08, Aug. 1994, "New Common User Access Control: Pushpad for Greater Mouse Productivity," pp. 497–499.

IBM Technical Disclosure Bulletin, vol. 38, No. 01, Jan. 1995, "Speed–Sensitive Scroll Widgets," pp. 483–484.

IBM Patent Application, "A Graphical User Interface Method and System That Provides An Inertial Within a Scroll Bar" filed Feb. 21, 1997, and issued Ser. No. 08/804,460 (IBM Docket RO997–006).

IBM Patent Application , "Scroll Bar Amplification Apparatus and Method" filed Mar. 19, 1997, an Ser. No. 08/820,798 (IBM Docket RO997–007).

IBM Patent Application, "A Document Interface Mechanism and Method for Navigating Through Large Documents" filed Jul. 11, 1997, and issued Ser. No. 08/893,469 (IBM Docket RO997–060).

* cited by examiner

Primary Examiner—Raymond J. Bayerl
Assistant Examiner—Cuong T. Thai
(74) Attorney, Agent, or Firm—Steven W. Roth (57) ABSTRACT

The scroll box processor of the present invention provides increased access capabilities by providing four different access modes. Each mode involves a different level of access (i.e., coarse to fine). The fine access mode provides unit by unit access (line by line in the case of a document) by allowing the user to accomplish fine access through the scroll box itself. The remaining access modes are provided by combining conventional left mouse button/scroll box interaction with user mode selection.

21 Claims, 7 Drawing Sheets

GRAPHICAL USER INTERFACE SCROLL BAR THAT PROVIDES VARIED LEVELS OF ACCESS GRANULARITY

FIELD OF THE INVENTION

The present invention relates to data processing systems. More particularly, the present invention relates to scroll bars within graphical user interfaces.

BACKGROUND OF THE INVENTION

Even the earliest computer system included a rudimentary mechanism that allowed it to receive input from its users. These mechanisms are often called user interfaces. The user interfaces of early computers often employed lights and switches that allowed the computer system user to communicate with the computer system in the system's native language. While this form of communication was effective, its use was essentially limited to scientists and engineers who were trained to understand the particulars of the computer system. For this reason, computer system providers moved to user interfaces that provided for entry of textual commands. While these command-based user interfaces were easier to use than their predecessors, they still typically involved a large number of commands that were often difficult for non-technical individuals to understand and remember. The shortcomings of command-based user interfaces led to the introduction of graphical user interfaces, which are often referred to as GUIs. Instead of requiring the user to have in-depth knowledge of the computer system, graphical user interfaces allow the every day user to communicate with the computer system via a pointing device such as a mouse. To use the computer system to perform various tasks, the user simply "points and clicks" on various GUI items such as icons and taskbars. These icons and taskbars are user friendly ways of activating different programs on the computer.

After a program has been activated, it will often portray itself to the user in the form of another GUI item called a window. The term window is chosen because, like regular windows in a house or office building, what can be seen through the window represents only a portion of the object that is being viewed. For this reason, windows often include what is referred to as a scroll bar. Scroll bars typically include long rectangular shafts that house a scroll box (sometimes called a puck, slider, or thumb). The user is allowed to move the scroll box up and down the scroll bar shaft to bring different portions of the object into view. Scroll bars also typically include "up arrows" and "down arrows," which also allow the user to see different portions of the object being viewed.

Scroll boxes are typically used within windows to provide what we will call coarse access to the underlying object. Up arrows and down arrows, on the other hand, are typically used to provide the user with what we will call fine access. To make this point more clear, consider an object that is made up of several pages of text (e.g., a large document). When a user is looking at this type of object through a GUI window, he or she is able to see only a portion of the object (i.e., perhaps only a page or slightly more). The user then moves the scroll box or the up or down arrows to view the other pages of the object. If the user wants to move several pages forward or backward, the scroll box will be used, but if the user wants to move only a short distance, perhaps only a line or two, the up or down arrows are used.

One problem with today's scroll bars involves the access or viewing of large objects. Simply stated, the coarse access provided by scroll boxes to large objects is too coarse and the fine access provided to large objects by the up and down arrows is too fine. This problem can often frustrate a user because when he or she wants to move to a particular place (e.g., a page), use of the scroll box causes the user to "fly by" their location of interest, while use of the up or down arrows seemingly takes an eternity. Another problem with today's scroll box/arrow design is that the user must move off of the scroll box after coarse access to the arrows to gain fine access and move off of the arrows after fine access to the scroll box to gain coarse access. This design is inefficient and time consuming because it causes the user to waste time moving back and forth.

Given that a program's "usability" or friendliness is a large factor in a user's value assessment, these access problems can have a negative impact on program provider sales. It is clear, then, that a scroll bar with improved access capabilities represents a valuable addition to the art.

SUMMARY OF THE INVENTION

Accordingly, a principal object of this invention to provide an enhanced scroll bar.

It is another object of this invention to provide an enhanced scroll bar with varied levels of access granularity.

It is still another object of this invention to provide an enhanced scroll bar that provides the user with fine access control via a scroll box.

These and other objects of the present invention are accomplished by the enhanced scroll box processor disclosed herein. The scroll box processor of the preferred embodiment provides increased access capabilities by providing four different access modes. Each mode involves a different level of access (i.e., coarse to fine). The fine access mode provides unit by unit access (line by line in the case of a document) by allowing the user to accomplish fine access through the scroll box itself. While this access level is the same as that provided by prior art up and down arrows, the user is not forced to leave the scroll box to gain this access level. The remaining access modes are referred to herein as intrawindow access mode, interwindow access mode, and travel access mode. The scroll box processor of the preferred embodiment provides these three access levels by combining conventional left mouse button/scroll box interaction with user mode selection.

DESCRIPTION OF THE PREFERRED EMBODIMENT

Figure 1A:
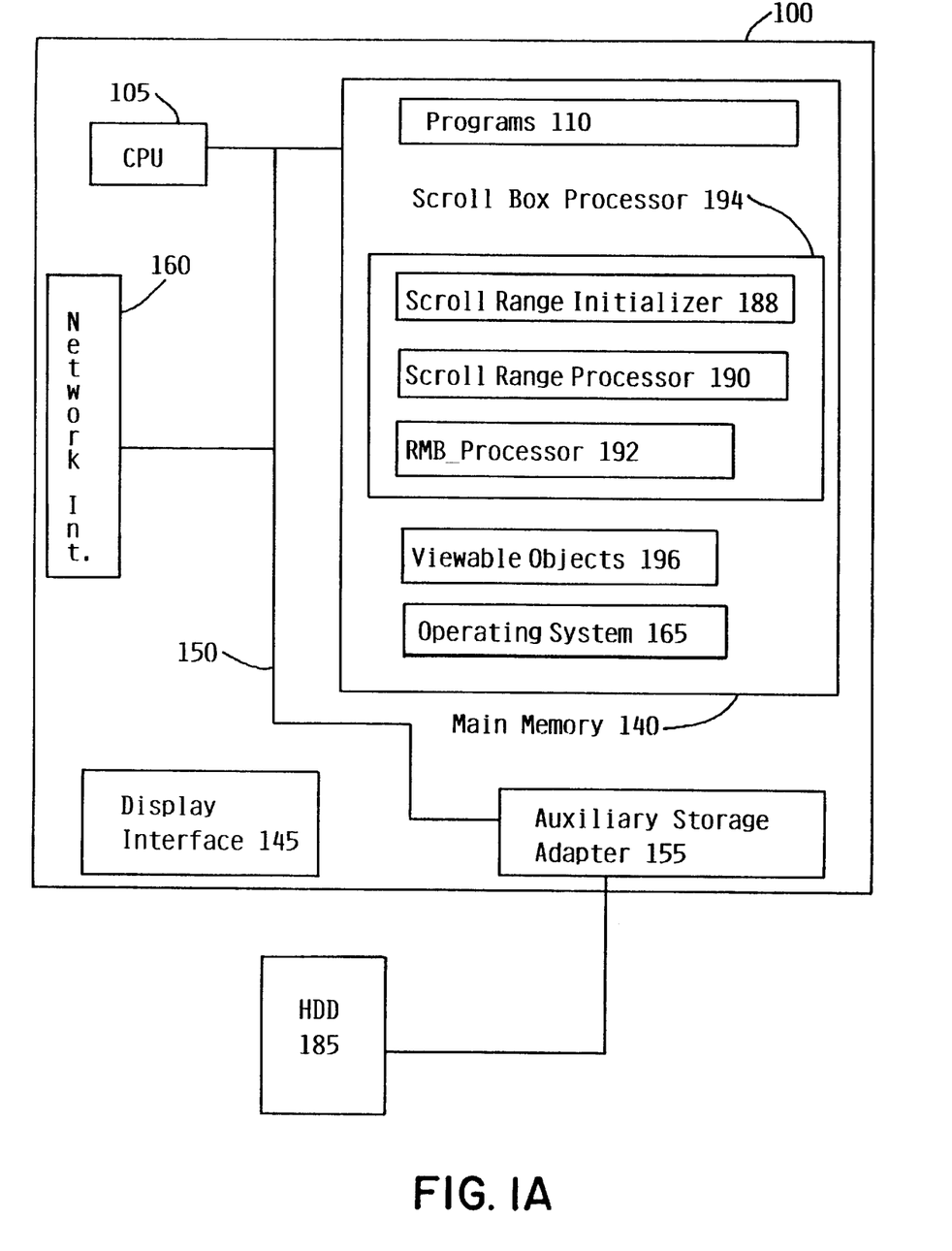
FIG. 1A is a block diagram of the computer system of the preferred embodiment.

Turning now to the drawings, FIG. 1A shows a block diagram of the computer system of the present invention.

The computer system of the preferred embodiment is an enhanced IBM 350 P100 computer system. However, those skilled in the art will appreciate that the mechanisms and apparatus of the present invention apply equally to any computer system, regardless of whether the computer system is a complicated multi-user computing apparatus or a single user workstation such as a network computer. As shown in the exploded view of FIG. 1, computer system 100 comprises main or central processing unit (CPU) 105 connected to main memory 140, display interface 145, auxiliary storage adapter 155, and network interface 160. These system components are interconnected through the use of system bus 150. Auxiliary storage adapter 155 is used to connect mass storage devices ( such as DASD device 185) to computer system 100.

Computer system 100 utilizes well known virtual addressing mechanisms that allow the programs of computer system 100 to behave as if they have access to a large, single storage entity instead of access to multiple, smaller storage entities such as main memory 140 and DASD device 185. Therefore, while programs 110, scroll box processor 194, viewable objects 196, and operating system 165 are shown to reside in main memory 140, those skilled in the art will recognize that these programs are not necessarily all completely contained in main memory 140 at the same time. (It should also be noted that the term "computer system memory" is used herein to generically refer to the entire virtual memory of computer system 100.)

Programs 110 are computer programs that rely on scroll box processor 194 to provide the enhanced access capabilities of the present invention. As such, scroll box processor 194 is an enhancement to the window handling facilities of each of programs 110. Those skilled in the art, however, will recognize that scroll box processor 194 could alternatively be built into operating system 165.

As stated, scroll box processor 194 is the mechanism of the preferred embodiment that provides the enhanced access capabilities of the present invention. Scroll box processor 194 comprises scroll range initializer 188, which is described in detail in the text associated with FIG. 2A; scroll range processor 190, which is described in detail in the text associated with FIG. 3; and right mouse button processor (RMB_processor) 192, which is described in detail in the text associated with FIG. 4. CPU 105 is suitably programmed to catty out the steps of scroll box processor 194 of the preferred embodiment, as described in FIGS. 2 through 4. However, in lieu of a processor-based system, the functions of FIGS. 2 through 4 could be implemented in control circuitry through the use of logic gates, programmable logic devices, or other hardware components.

Viewable objects 196 are objects that are capable of being viewed and scrolled by a user (e.g., documents, drawings, data entry screens, etc.).

Operating system 165 is the operating system known in the industry as Windows 95; however, those skilled in the art will appreciate that the spirit and scope of the present invention is not limited to any one operating system.

As a final preliminary matter, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks hard disk drives, and CD ROMs and transmission-type media such as digital and analog communications links, be they line-based communication links or wireless communication links.

Figure 1B:
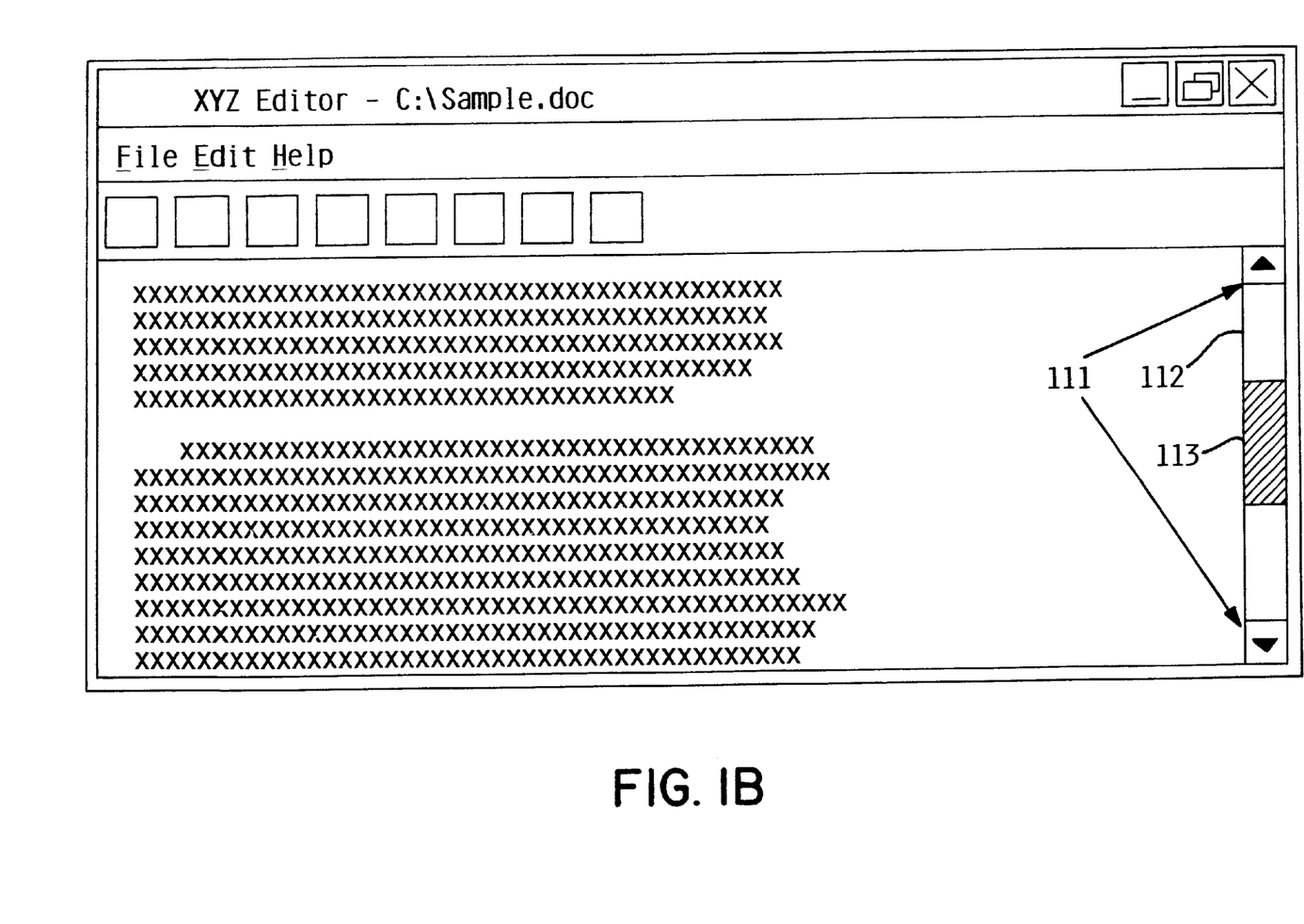
FIG. 1B is a pictorial representation of a scroll bar and its constituent elements, as displayed by an example program.

FIG. 1B shows an example viewable object (i.e., one of viewable objects 196) being portrayed to a user by an example program (i.e., one of programs 110). As shown the example program is an editor. The editor makes use of a scroll bar that includes up and down arrows 111, scroll bar shaft 112, and scroll box 113. Assume for the purposes of explanation that the document being shown to the user, "sample.doc," is a fifteen hundred (1500) line document.

Scroll Range and State Initialization

Figure 2A:
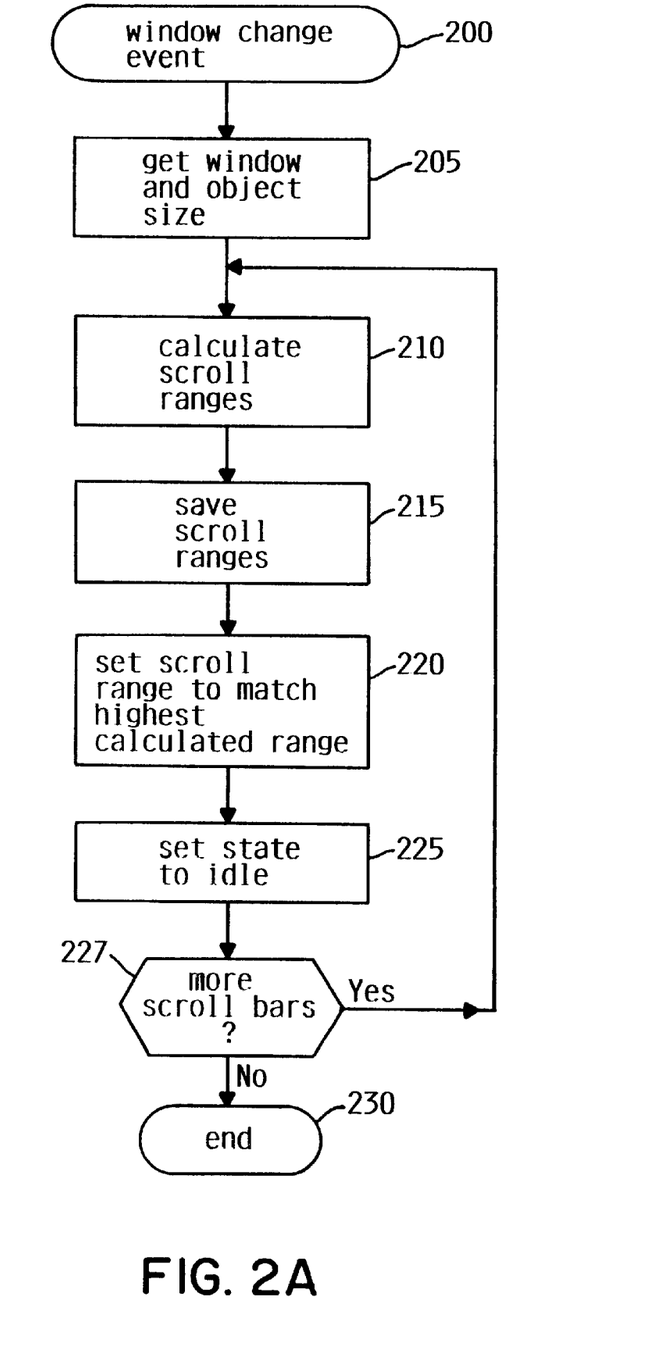
FIG. 2A is a flow diagram that shows steps used to carry out the scroll range initializer of the preferred embodiment.

FIG. 2A is a flow diagram that shows steps used in the preferred embodiment to carry out the scroll range initializer of the present invention. In block 200, scroll range initializer 188 is informed of a window change event. While the exact means used to notify scroll range initializer 188 of the window change event is not important to the teachings of the present invention, it is important that scroll range initializer 188 be notified of any change to the size of the window or to the contents of the object being portrayed. If the window is made smaller or larger, scroll range initializer 188 will need to recalculate the intrawindow, interwindow, and travel access ranges. Scroll range initializer will similarly need to recalculate these ranges whenever the underlying object is increased or decreased in size.

In block 205, scroll range initializer 188 determines the window and object size. Again, the exact means used to acquire this information is not important to the benefits and advantages of the present invention. Accordingly, those details are not provided here. Scroll range initializer then calculates the scroll ranges in block 210. In the preferred embodiment, the scroll ranges are calculated using the scroll range table below; however, those skilled in the art will recognize that neither the spirit nor scope of the present invention are limited to any particular method of calculation. Scroll range, which is a Windows 95 term, is the number of different discrete positions at which a scroll box can reside on a scroll bar shaft. For example, if a scroll bar is set up to have a scroll range of two hundred (200), the scroll box would be positioned in the middle of the underlying object when it was at a position of one hundred (100) on the scroll bar shaft. Naturally, then, the greater the scroll range, the greater the number of scroll box positions, and the greater the number of scroll box positions, the finer the access to the underlying viewable object.

The term windows is used in the table to represent a count that equals the number of contiguous logical windows which it would take to span the entire object. The object line count term from the table represents the number of lines contained in the entire object. For example, if an object had an object line count of one hundred (100) and the window was sized such that five lines (5) could be displayed in a single window, the object would be said to comprise twenty (20) contiguous logical windows. The scroll range is expressed within the table in terms of windows or in terms of object line count, depending upon the mode at issue.

The thresholds shown in the table denote the number of logical windows above which the particular mode will become active (i.e., available to the user). These thresholds are included in the preferred embodiment because, as mentioned, the benefits and advantages of the present invention are particularly applicable to larger viewable objects. While the teachings of the present invention could technically be applied to smaller objects, the benefits would be slight. The default value calculations shown in the table are used to initialize the scroll range after a window change event. The table shows the window count at which the various access modes are used as the default or initial access mode. The logic used in the preferred embodiment is to initialize the scroll range to provide the coarsest access available (i.e., based on the object size threshold). This approach has been taken because it is felt that users are likely to first move in a coarse fashion and then to finer and finer access as they close in on their particular location of interest.

Scroll Range Table

|  | IntraWindow Mode | InterWindow Mode | Travel Mode |
|---|---|---|---|
| Scroll Range Threshold | 4 X windows | .20 object line count | .10 object line count |
|  | none | windows m 5 | windows m 40 |
| Default | windows [ 4 | 5 [ windows [ 39 | 40 [ windows |

Once the scroll ranges have been calculated in block 210, scroll range initializer 188 saves the scroll ranges {block 215}, sets the current scroll range to provide the coarsest access available {block 220), and sets the state to idle {block 225}. This process repeats for each scroll bar being portrayed by the program (i.e., one of programs 110) {see block 227 }. Once all of the scroll bars have been initialized, scroll range initializer terminates execution in block 230.

Figure 2B:
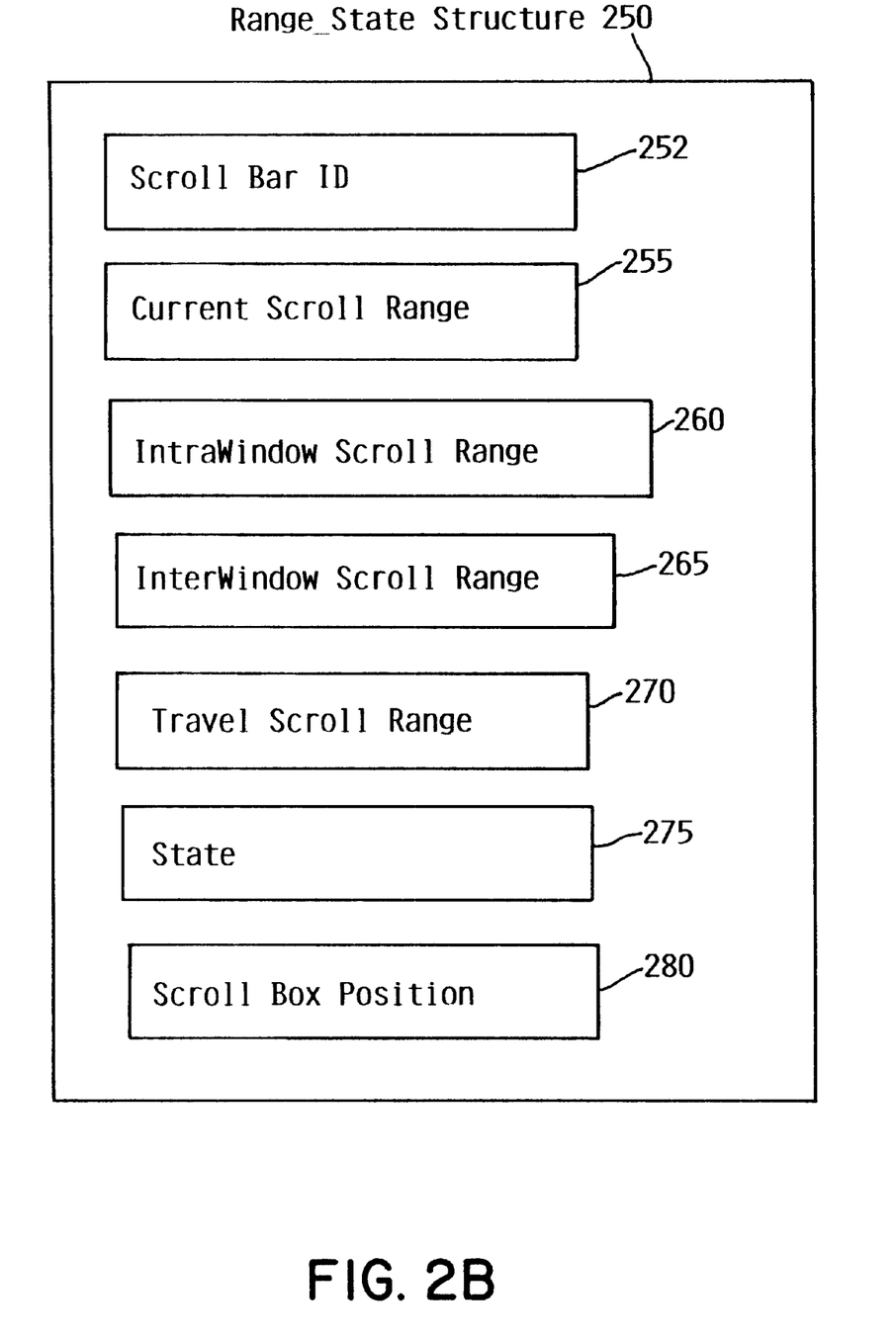
FIG. 2B is a diagram that shows the range_state structure used in the preferred embodiment.

FIG. 2B is a diagram that shows the range_state structure used in the preferred embodiment of the present invention. This structure is used to store the values saved and set by scroll range initializer 188. Each scroll bar portrayed by a program will have associated with it a range_state structure. As shown, range_state structure 250 comprises scroll bar ID field 252, current scroll range field 255, intrawindow scroll range field 260, interwindow scroll range field 265, travel scroll range field 270, state field 275, and scroll box position field 280. Scroll bar ID field 252 is used to store an identifier for the scroll bar at issue. As their names suggest, each of the scroll range fields is used to store the scroll range that was calculated or set by scroll range initializer 188. State field 275 is similarly used to store the current state and scroll box position field 280 is used to store the last known position of the scroll box on the scroll bar shaft. The state and scroll box position is used by RMB_processor 192, which is explained in detail in the text associated with FIG. 4.

Scroll Range Adjustment—IntraWindow, InterWindow, and Travel Access Modes

Figure 3:
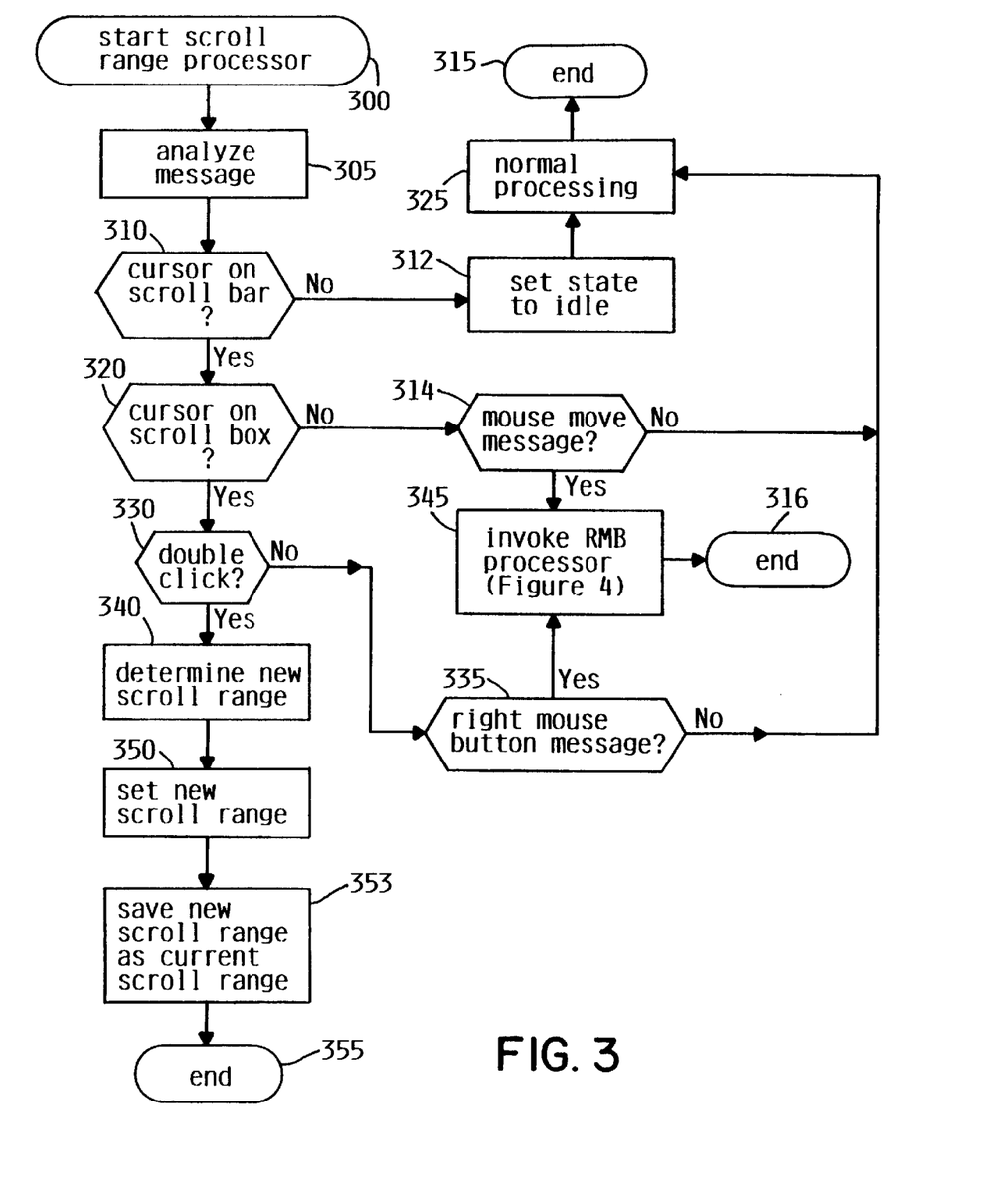
FIG. 3 is a flow diagram that shows steps used to carry out the scroll range processor of the preferred embodiment.

FIG. 3 is a flow diagram that shows steps used in the preferred embodiment to carry out the scroll range processor of the present invention. When the program (i.e., one of programs 110) that has been enhanced with scroll box processor 194 receives a window message from operating system 165, it invokes scroll range processor 190 in block 300. Scroll range processor 190 then proceeds to analyze the received message in block 305 and determine whether the cursor (also referred to as the position identifier) was on the scroll bar at the time the message was generated {block 310}. In Windows 95, the hit-test value within the message can be used to make this determination. If the message was not generated at a time when the cursor was located on the scroll bar, scroll range processor 190 proceeds to set the state to idle {block 312} to ensure that fine access mode processing (if any) is terminated. Scroll range processor 190 then proceeds with normal processing {block 325} before terminating execution in block 315. By "normal processing," we mean that the program takes whatever action it would have taken in the absence of scroll box processor 194. These details are not presented here since they are not important to the present invention and vary based on the particular program involved.

If in block 310, scroll range processor 190 determines that the subject message was generated when the cursor was on the scroll bar, it will then check whether the cursor was also on the scroll box {block 320}. In Windows 95, this can be determined via the cursor's x-y coordinates, which are contained in the message. If not, scroll range processor 190 determines whether the message is a mouse move message {block 314}. The Windows 95 message used in the preferred embodiment is the WM_NCMOUSEMOVE message. If so, RMB_processor 192 is initiated in block 345. If not, normal processing {block 325} and termination {315} occur as was described above.

If the cursor was on the scroll box when the message was generated {block 320}, scroll range processor 190 determines whether the message was a left mouse button double-click message {block 330}. (Note that while the preferred embodiment uses the left mouse button double-click operation as the input operation used to effectuate scroll range change, other input operations are possible within the spirit and scope of the present invention.) In Windows 95, the left mouse button double-click message is the WM_NCLBUTTONDBLCLK message. If this message has been received, the user has selected a different access mode. Accordingly, scroll range processor 190 will determine the new scroll range {block 340}.

In the preferred embodiment, the scroll range is determined in the following fashion. Assuming all of the access modes are available (i.e., the data object is big enough), the initial scroll range will be that of Travel mode. The user's first double-click will cause scroll range processor 190 to change the scroll range to InterWindow mode, allowing the user to move with finer access. Another double-click will cause scroll range processor 190 to change the scroll range to IntraWindow mode, allowing the user to move to even finer access. Yet another double-click will cause scroll range processor 190 to change the scroll range back to Travel mode again. In this manner, the user is able to select between three discrete access modes. (Note that in the preferred embodiment once the user changes the scroll range using the left mouse button double-click operation, they simply use the standard left mouse button drag operation to move the scroll box). Changes in scroll rate are effectuated within the preferred embodiment using the Windows 95 SetScrollInfo function. Once scroll range processor 190 successfully sets the new scroll range {block 350}, scroll range processor 190 saves the new scroll range in the current scroll range field of range_state structure 250 {block 353}, and terminates execution in block 355.

Returning now to block 330 of FIG. 3, if scroll range processor 190 determines that the subject message is not a left mouse double-click message, scroll range processor 190 determines whether the message is a right mouse button message. The Windows 95 messages used in the preferred embodiment are the WM_NCRBUTTONDOWN and WM_NCRBUTTONUP messages. If the subject message is not one of these messages, normal processing {block 325} and termination occur {block 315} as was described above. If, however, one of these messages is detected, scroll range processor 190 invokes RMB_processor 192.

Right Mouse Button Processing—Fine Access Mode

Figure 4A:
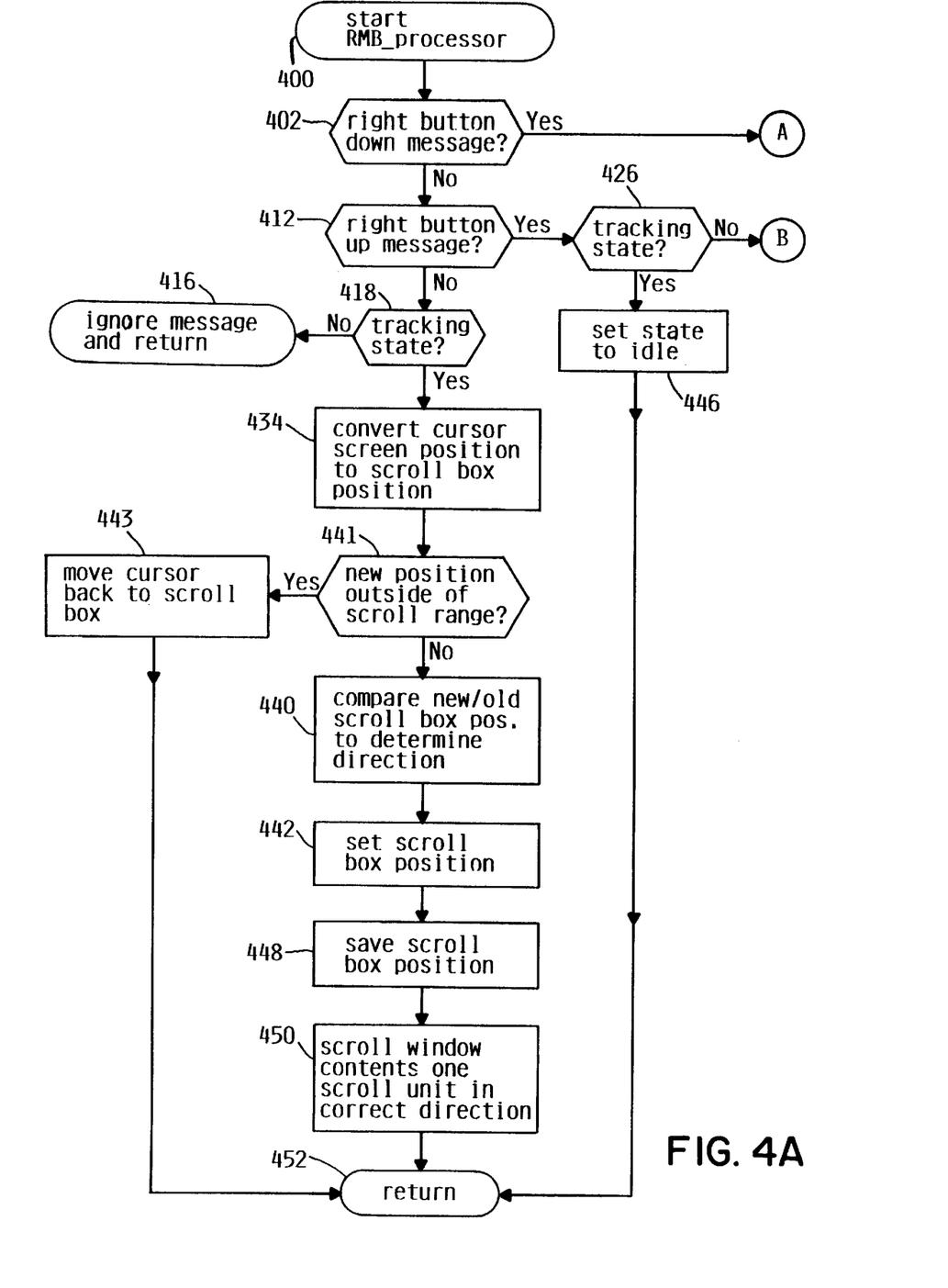
FIG. 4 is a flow diagram that shows steps used to carry out the light mouse button processor of the preferred embodiment.
Figure 4B:
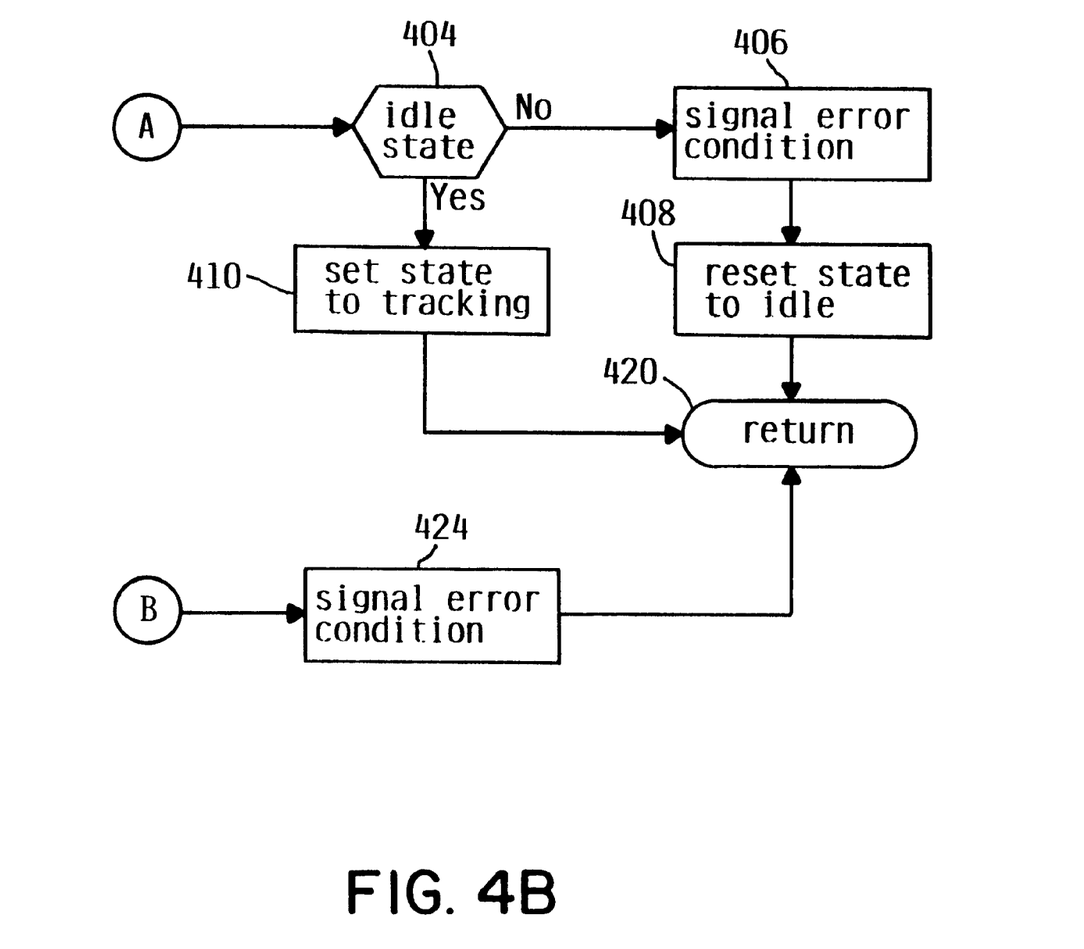

FIG. 4 is a flow diagram that shows steps used in the preferred embodiment to carry out the right mouse button processor of the present invention. In the preferred embodiment, the user is able to initiate fine access mode from the scroll box (i.e., without having to move to the up or down arrow) by performing a drag operation on the scroll box using the right mouse button. Those skilled in the art, however, will appreciate that other input operations are possible within the spirit and scope of the present invention. For example, a middle mouse button operation or a two button mouse button operation could also be used.

After being initiated in block 400, RMB_processor 192 determines whether the message being processed is a right mouse button down message (e.g., WM_NCRBUTTONDOWN in Windows 95) {block 402}. If so, RMB_processor 192 checks the range_state structure of the subject scroll bar and determines whether the scroll bar is currently in the idle state {block 404}. (Please note that the "idle" state, and its counterpart, the "tracking" state, are used solely for right mouse button processing and have no meaning outside of the preferred embodiment of the present invention.) If RMB_processor 192 determines that a right mouse button down message was received, but that the scroll bar is not in the idle state, RMB_processor 192 knows that a message must have been missed because right mouse button down messages should not be received when in the scroll bar is not in the idle state. Accordingly, RMB_processor 192 signals an error condition to operating system 165 {block 406}, resets the state to idle {block 408}, and returns to scroll range processor 190 {block 420}.

If in block 404 RMB_processor 192 determines that the scroll bar is in the idle state, RMB_processor 192 sets the state to the tracking state {block 410} and returns {block 420}. The transition to the tracking state means that the user has depressed the right mouse button on the scroll box and wishes to initiate fine access using the scroll box and right mouse button instead of the up and down arrows.

Returning now to block 402, if RMB_processor 192 determines that the message received was not a right mouse button down message, RMB_processor 192 next determines whether the message at issue was a right mouse button up message (e.g., WM_NCRBUTTONUP in Windows 95) {block 412} and then determines whether the scroll bar is currently in the tracking state {block 426}. If RMB_processor 192 determines that a right mouse button up message was received, but that the scroll bar is not in the tracking state {block 426}, RMB_processor 192 knows that a message must have been missed because right mouse button up messages should not be received when in the scroll bar is not in the tracking state. Accordingly, RMB_processor 192 signals an error condition to operating system 165 {block 424} and returns to scroll range processor 190 {block 420}.

If RMB_processor 192 determines that the scroll bar was in the tracking state as it should be, RMB_processor 192 knows that the user has stopped moving the scroll box, which means that the user has terminated fine access. Accordingly RMB_processor 192, sets the state back to idle {block 446} and returns to scroll speed processor 190 {block 450}.

Returning now to block 412, if the message is not a right mouse button up message, RMB_processor 192 knows that the message must be a mouse move message (e.g., the WM_NCMOUSEMOVE in Windows 95). RMB_processor 192 will then determine whether the scroll bar is in the tracking state {block 418}. If not, RMB_processor 192 ignores the message and returns to scroll range processor 190 {block 416}. If the scroll bar is in the tracking state, RMB_processor 192 converts the cursor screen position (as determined from the x-y coordinates in the mouse move message) to a scroll box position {block 434}. In the preferred embodiment, this is accomplished by mapping the cursor screen position to a particular location on the scroll bar. The value of the closest integer within the scroll range is then determined (i.e., because the scroll range values are equally distributed along the scroll bar). This integer then becomes the new scroll box position. If the new position is respectively greater than or less than the maximum or minimum of the scroll range {block 441}, RMB_processor 192 simply moves the cursor back to the position of the current scroll box {block 443} and returns to scroll range processor 190 in block 452. This processing prevents the user from moving the scroll box off of the scroll bar.

If the new scroll box position is within the scroll range, it is compared with the old scroll box position from field 280 of the range_state structure shown on FIG. 2B {block 440}. This is done to determine the direction of the user's movement. From there, the new scroll box position is set using the SetScrollInfo function in Windows 95 {block 442} and saved in the range_state structure {block 448}. RMB_processor 192 then scrolls the contents of the window one unit (typically text line) in the direction determined in block 440 before returning to scroll range processor 190 in block 452.

PROCESSING EXAMPLE

The document shown in FIG. 1B will now be used to provide an example of the processing of the mechanisms of the present invention. When the associated editor is first initialized, scroll range initializer 188 will also be initiated. Scroll range initializer 188 will first determine the window and object size. As shown the window is capable of displaying 15 lines at a time. Assume here that the object being shown is fifteen hundred (1500) lines long, which means that it has a window count of one hundred and fifty (150). Scroll range initializer 188 will then calculate the various scroll range values. Use of the Scroll Range Table will yield the following scroll range values.

| Example Scroll Range Values | | |
| --- | --- | --- |
| IntraWindow Mode | InterWindow Mode | Travel Mode |
| Scroll Range 600 (4 X windows) | 300 (.20 object line count) | 150 (.10 object line count) |

Since travel mode is available (i.e., because the window count is greater than 40), scroll range initializer 188 will use one hundred fifty (150) as the default scroll range.

Once the scroll ranges have been initialized, the mechanisms of the present invention simply wait for the user to change the scroll range by double-clicking on the scroll box or to initiate the fine access mode by depressing the right mouse button on the scroll box and dragging the scroll box on the scroll bar. Assume here that the user has moved to a particular location within the document shown on FIG. 1B using the default scroll range (i.e., travel mode here) and now wishes to change the scroll range to a finer access mode. As stated, this is accomplished by double-clicking on the scroll box. This double-click message is received by scroll range processor 190. Scroll range processor 190 then determines from the range_state structure that the current access mode is travel mode. Hence, scroll range processor 190 changes the scroll range to InterWindow mode (i.e., a scroll range of three hundred (300)) in response to the user's request. See processing blocks 330, 340, 350, and 353 of FIG. 3. Note here again that the greater the scroll range, the finer the access that is provided to the user. If the user double-clicks again (either right away or after some movement), scroll range processor 190 will again change the scroll range, this time to IntraWindow mode (i.e., a scroll range of six hundred (600)). Another double-click will cause the scroll range to move back to the travel mode. In this manner, the user is able to cycle through the available access modes.

If the user wishes to use line by line fine access via the scroll box, the user need only depress the right mouse button while the cursor (position identifier) is on the scroll box and then drag the scroll box (i.e., holding the right mouse button down) in the desired direction. This action will cause initiation of RMB_processor 192. When the right mouse button is depressed, RMB_processor 192 causes the scroll bar to go into its tracking state (see processing blocks 402 and 410 of FIG. 4) and look for mouse move messages. So long as the user does not move off of the scroll bar or beyond its limits, every movement of the position identifier will cause a mouse move message, which will in turn cause the contents of the window to be scrolled one scroll unit in the desired direction (see processing blocks 434, 441, 443, 440, 442, 448, 450 and 452). To terminate fine access, the user simply "lets up" on the right mouse button. See processing blocks 412 and 446 of FIG. 4).

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus, said apparatus comprising:
   a processor;
   memory connected to said processor; and
   a program for portraying a viewable object to a user, said program being stored in said memory for execution on said processor, said program comprising a scroll bar to aid said user, said scroll bar comprising a scroll box, said scroll box being used to access said viewable object via more than one discrete access mode.

2. The program of claim 1 wherein said discrete access mode is selectable by said user.

3. The program of claim 2 wherein said scroll box is moved by said user via a first input operation and said discrete access mode is selected by said user via a second input operation.

4. The program of claim 3 wherein said second operation is a double-click operation.

5. An apparatus, said apparatus comprising:
   a processor;
   memory connected to said processor; and
   a program for portraying a viewable object to a user, said program being stored in said memory for execution on said processor, said program comprising a scroll bar to aid said user, said scroll bar comprising a scroll box, said scroll box being used to access said viewable object through a first access mode and through a second access mode, said first access mode being initiated by said user via a first input operation and said second access mode being initiated by said user via a second input operation.

6. The program of claim 5 wherein said first input operation is a left mouse button operation and wherein said second input operation is a right mouse button operation.

7. The program of claim 5 wherein said first input operation causes initiation of a coarse access mode and wherein said second input operation causes initiation of a fine access mode.

8. A program product, said program product comprising:
   signal bearing media; and
   a mechanism recorded on said signal bearing media, said mechanism being used to portray a viewable object to a user, said mechanism comprising a scroll bar to aid said user, said scroll bar comprising a scroll box, said scroll box being used to access said viewable object via more than one discrete access mode.

9. The program product of claim 8 wherein said discrete access mode is selectable by said user.

10. The program product of claim 9 wherein said scroll box is moved by said user via a first input operation and said discrete access mode is selected by said user via a second input operation.

11. The program product of claim 10 wherein said second input operation is a double-click operation.

12. The program product of claim 8 wherein said signal bearing media is recordable media.

13. The program product of claim 8 wherein said signal bearing media is transmission-type media.

14. A program product, said program product comprising:
    signal bearing media; and
    a mechanism recorded on said signal bearing media, said mechanism being used to portray a viewable object to a user, said mechanism comprising a scroll bar to aid said user, said scroll bar comprising a scroll box, said scroll box being used to access said viewable object through a first access mode and through a second access mode, said first access mode being initiated by said user via a first input operation and said second access mode being initiated by said user via a second input operation.

15. A computer-implemented method, said method comprising the steps of:
    receiving a first request from a user to move a scroll box on a scroll bar to access a viewable object that is associated with said scroll bar;
    moving said scroll box in response to said first request using a first access mode;
    receiving a second request from said user to move said scroll box on said scroll bar to access said viewable object; and
    moving said scroll box in response to said second request using a second access mode.

16. The computer-implemented method of claim 15 further including the step of receiving a request from said user to change said access mode from said first access mode to said second access mode.

17. The computer-implemented method of claim 16 wherein said step of receiving a request from said user to change said access mode from said first access mode to said second access mode occurs when said user double-clicks on said scroll box.

18. A computer-implemented method, said method comprising the steps of:
   receiving a first input from a user to access a viewable object using a scroll box in a first access mode; and
   receiving a second input from said user to access said viewable object using said scroll box in a second access mode.

19. The computer-implemented method of claim 18 wherein said first input is a left mouse button operation and wherein said second input is a right mouse button operation.

20. The computer-implemented method of claim 18 wherein said first input causes initiation of a coarse access mode and wherein said second input causes initiation of a fine access mode.

21. The computer-implemented method of claim 19 wherein said right mouse button operation is a drag operation.

* * * * *